United States Patent Office 3,067,221
Patented Dec. 4, 1962

3,067,221
SULFATED HYDROXYALKYLESTERS
Hendrik Buesink and Pieter L. Kooijman, Amsterdam, Netherlands, assignors to Shell Oil Company, New York, N.Y., a corporation of Delaware
No Drawing. Filed Dec. 26, 1961, Ser. No. 162,200
Claims priority, application Netherlands Dec. 30, 1960
21 Claims. (Cl. 260—400)

This invention relates to surface active compounds and compositions and to their production. The invention relates more particularly to the production of novel sulfated hydroxyalkyl esters of tertiary alkanoic acids and novel surface active compositions comprising sulfated hydroxyalkyl esters of tertiary alkanoic acids.

Methods have been disclosed heretofore for the production of surface active compounds consisting essentially of sulfated alkyl esters of alkanoic acids. As obtained heretofore many of these products often vary considerably in characteristics desired in surface active compositions intended for practical utility. Often they are lacking in a satisfactory degree of stability, particularly with respect to resistance to hydrolysis, and in wetting capacity, forming power, and the like.

It is, therefore, an object of the present invention to provide an improved process for the production of novel compounds and compositions comprising sulfated tertiary alkanoic acid esters of hydroxy-alkanes and salts thereof.

Another object of the invention is the provision of an improved process for the production of novel surface active compositions comprising sulfated hydroxyalkyl esters derived from tertiary alkanoic acids.

A specific object of the invention is the provision of an improved process for the production of novel surface active compositions comprising sulfated monoglycerides derived from tertiary alkanoic acids of eight to twenty-one carbon atoms. Other objects and advantages of the present invention will become apparent from the following detailed description thereof.

In accordance with the present invention novel surface active compounds and compositions consisting essentially of sulfated tertiary alkanoic monocarboxylic acid esters of hydroxy-substituted alkanes are produced by the reaction of an epoxyalkyl ester of an alkane carboxylic acid having a quaternary carbon atom in alpha position with respect to the carboxyl carbon atom with sulfuric acid.

The alkane tertiary-monocarboxylic acid esters of epoxy-alkanols employed as a starting material in the process of the invention comprise broadly those represented by the general formula:

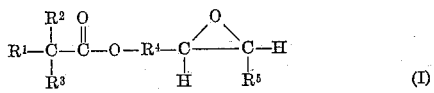

wherein:

$R^1$, $R^2$ and $R^3$ are alkyl;
The sum total of the carbon atoms in $R^1+R^2+R^3$ has a value of from 3 to about 19;
$R^4$ represents an alkylene group of 1 to about 8 carbons;
$R^5$ is hydrogen or alkyl; and
The sum total of the carbon atoms in $R^4+R^5$ has a value from 1 to about 20.

In the foregoing Formula I $R^1$, $R^2$ and $R^3$, and also $R^5$ when alkyl, may each represent an alkyl such as, for example, methyl, ethyl, propyl, butyl, pentyl, hexyl, heptyl, decyl, etc.; they may be of branched or straight chain structure. The alkylene radical $R^4$ may be of straight chain or branched structure. The suitable esters may be further substituted by functional groups which do not enter into or interfere with, the desired reaction under the conditions employed. It is seen that the suitable epoxy-esters contain at least five carbons in the acid portion of the molecule. They may be referred to as trialkyl acetic acid esters of epoxy-substituted alkanols, such as, for example, the trimethyl acetic acid ester, the dimethyl ethyl acetic acid ester, the tributyl acetic acid ester, the propyl diamyl acetic acid ester, the triamyl acetic acid ester, the dihexyl heptyl acetic acid ester, etc., of epoxy-substituted alkanols. Of the defined esters the 1,2-epoxy-substituted esters, that is those having the epoxy-oxygen attached to vicinal carbon atoms of the epoxy-substituted alkyl group of the ester, are preferred. Examples of the suitable tertiary monocarboxylic acid esters of epoxy-substituted hydroxyalkanes defined by foregoing Formula I are:

TABLE A

Ref. No.:
(1) Trimethyl acetic acid ester of 3-hydroxy-1,2-epoxypropane.
(2) 2,2-dipropylpentanoic acid ester of 4-hydroxy-1,2-epoxybutane.
(3) 2,2-dimethylbutanoic acid ester of 3-hydroxy-1,3-dimethyl-1,2-epoxypropane.
(4) 2-ethyl-2-methylheptanoic acid ester of 3-hydroxy-1,2-epoxybutane.
(5) 2,2,4,4-tetramethylpentanoic acid ester of 6-hydroxy-2-ethyl-2,3-epoxyhexane.
(6) 2-ethyl-2-methylpentanoic acid ester of 4-hydroxy-3-ethyl-1,2-epoxybutane.
(7) 2-cyclohexyl-2-methylpropionic acid ester of 4-hydroxy-1,2-epoxybutane.
(8) Tributyl acetic acid ester of 3 - hydroxy - 1,2-epoxypropane.
(9) Trimethyl acetic acid ester of 10-hydroxy-1,2-epoxydecane.
(10) Dimethyl ethyl acetic acid ester of 7-hydroxy-6-methyl-1,2-epoxyheptane.

Preferred among the suitable epoxy esters employed as starting materials for the process of the invention are the tertiary alkanoic acid esters of 1,2-epoxy-3-hydroxypropane and alkyl-substituted 1,2-epoxy-3-hydroxypropane (that is, the glycidyl esters and alkyl-substituted glycidyl esters of the trialkyl acetic acids) such as, for example:

Trimethyl acetic acid ester of 3-hydroxy-1,2-epoxypropane (glycidyl pivalate),
Dimethyl ethyl acetic acid ester of 3-hydroxy-1-methyl-1,2-epoxy propane,
Triethyl acetic acid ester of 3-hydroxy-1,2-epoxypropane.

Of these the tertiary alkanoic acid esters of 1,2-epoxy-3-hydroxypropane, that is those of the foregoing Formula I wherein $R^4$ is methylene and $R^5$ is hydrogen are particularly preferred. The epoxy esters of this preferred group wherein to total number of carbon atoms in $R^1+R^2+R^3$ is at least 8 are particularly desirable as starting material because of the valuable surface active compounds and compositions derived therefrom in the process of the invention.

The suitable tertiary monocarboxylic acid esters of epoxyalkanols defined by Formula I, used as starting materials in the process of the invention may be obtained from any suitable source. They may suitably be produced by interaction of a tertiary alkanoic acid with a suitable epoxy compound under conditions resulting in the production of the desired tertiary alkanoic acid ester of an epoxy alkanol of Formula I. Suitable epoxy alkyl esters of tertiary monocarboxylic acids may be obtained, for example, by reacting a salt, for example, an alkali metal salt of a tertiary monocarboxylic acid with a halogen-substituted epoxy alkane such as, a chloro-epoxy-alkane. Thus, the glycidyl esters of tertiary monocarboxylic acids are produced by gradual addition of the sodium salt of the tertiary monocarboxylic acid, preferably in the form of a concentrated aqueous solution, or else dissolved in a ketone, to boiling epichlorohydrin.

Essential to the attainment of the objects of the invention is the use as starting material of an epoxy-alkyl ester of an alkane carboxylic acid having a quaternary carbon atom in alpha position to the carboxyl group, that is containing a quaternary carbon atom directly linked by carbon to carbon bond to the carbon atom of the carboxyl group. Acids of this class, referred to herein as tertiary carboxylic acids, and used in the preparation of the suitable epoxy ester starting materials, comprise those represented by the general formula:

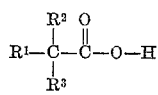

wherein $R^1$, $R^2$ and $R^3$ have the meaning indicated herein above in the definition of the Formula I.

The suitable monocarboxylic acids whose carboxyl group is linked to a quaternary carbon atom may be obtained from any suitable source. Excellent results are obtained, however, with tertiary monocarboxylic acids prepared by reacting aliphatic hydrocarbons with formic acid or with carbon monoxide and water. In this reaction the aliphatic hydrocarbons that are of primary interest are olefins. The reaction is executed in liquid phase at a temperature in the range of from about −25 to about 100° C. and at relatively low pressures, for example, in the range of from about 20 to about 150 atmospheres. Suitable methods for preparing the tertiary monocarboxylic acids are disclosed in U.S. Patent 2,876,241 and in copending applications Serial Nos. 858,609; 858,796; and 858,797, filed December 10, 1959. Suitable olefinic charge materials thus reacted with carbon monoxide and water to produce tertiary monocarboxylic acids comprise commercially available unsaturated hydrocarbons predominating in monoolefins such as, for example, branched or unbranched pentenes, hexenes, heptenes, octenes, nonenes, decenes and high alkenes; polymers and copolymers of such alkenes, such as diisobutylene, propylene-dimer, -trimer and -tetramer, isobutylene trimer; cyclic alkenes, such as cyclopentene and cyclohexene; etc. Commercially available mixtures comprising these alkenes are also used, for example, olefin-containing hydrocarbon fractions such as obtained by thermal vapor phase cracking of paraffin wax in the presence of steam. Olefin-rich products obtained in the Fischer-Tropsch synthesis carried out under moderate-pressure also constitute examples of a suitable source of the alpha-branched monocarboxylic acids. Monoolefins preferably employed in the production of the carboxylic acids comprise those having from about six to about twenty carbon atoms to the molecule.

Another method of producing suitable tertiary monocarboxylic acids comprises that relying upon the reaction of saturated hydrocarbons with carbon monoxide and water in the presence of a hydrogen acceptor as described and claimed in copending application Serial No. 141,287, filed September 28, 1961.

Other methods enabling the production of the alkanoic acids consisting of tertiary alkanoic acids from which the suitable epoxy esters of foregoing Formula I are derived comprise those disclosed and claimed in U.S. Patents 2,913,489; 2,913,491; and in copending U.S. application Serial No. 761,376, filed September 16, 1958. Still another method comprises the reaction of olefins with metal carbonyls, for example, nickel carbonyl, known as the "Reppe" method. It is to be understood that the invention is not limited with respect to the source of the tertiary alkanoic acids useful in the production of the epoxy ester starting materials of the process of the present invention.

Suitable methods for the production of tertiary alkanoic acid esters of epoxy alkanols, used as starting materials in the process of the present invention, comprise those disclosed and claimed in copending U.S. application Serial No. 28,865, filed May 13, 1960.

The component of the charge to the process of the invention consisting of tertiary monocarboxylic acid esters of epoxy alkanols, may consist of a single such epoxy ester or a mixture of two or more such esters. Excellent results in the production of surface active compositions are obtained when employing as the epoxy ester reactant a mixture of epoxy esters of the above defined structure derived from tertiary alkanoic acids having from 8 to about 21 carbon atoms, and preferably from about 14 to about 20 carbon atoms. Particularly suitable starting materials comprise mixtures of the epoxy esters above defined having from about 18 carbon atoms to the molecule. Such preferred admixtures of the epoxy esters include, for example, the glycidyl esters, the epoxy-butyl esters, the epoxy-hexyl ester, the epoxy-octyl esters, the 2,3-epoxy-4-phenyl octyl esters, and the like of mixtures of the tertiary alkanoic acids of 8 to 21 carbon atoms.

In accordance with the invention the above-defined tertiary monocarboxylic acid esters of epoxy-alkanols are reacted with sulfuric acid. Sulfuric acid employed as reactant is concentrated sulfuric acid, preferably consisting of from about 98 to about 100% $H_2SO_4$ by weight. The sulfuric acid is preferably employed in stoichiometric excess. The mol ratio of sulfuric acid to the epoxy ester reactant may be in the range of from about 1.5:1 to about 5:1 and preferably from about 2:1 to about 3.5:1. Somewhat higher or lower ratios of acid to epoxy ester reactant may, however, be employed within the scope of the invention.

Reaction of the sulfuric acid with the epoxy ester is preferably executed in the presence of an organic solvent or diluent which is relatively inert, or which does not adversely affect the sulfation reaction under the conditions employed. Suitable solvents or diluents comprise, for example, aliphatic ethers, such as, diethyl ether; dioxane, betachloroethyl ether; saturated hydrocarbons such as the lower paraffins, as pentane; and the chlorinated paraffins, as carbon tetrachloride and trichloroethane. Solvents or diluents preferred are those readily separated from the reaction mixture by distillation. Somewhat preferred is diethyl ether. The relative amount of solvent, or diluent, employed may vary considerably depending upon conditions employed and specific materials charged. In general, the ratio of solvent to sulfuric acid may range, for example, from about 1:1 to about 10:1, and preferably from about 2:1 to about 5:1 by weight.

Reaction of the tertiary alkanoic acid esters of epoxy alkanols wtih sulfuric acid is effected at a temperature of, for example, from about −20 to about 35° C., and preferably from about −10 to about 25° C. Somewhat higher or lower reaction temperatures may, however, be used within the scope of the invention. The temperature preferably employed will depend to some extent upon the specific reactants used. Reaction of the glycidyl esters of the tertiary alkanoic acids with the sulfuric acid is preferably carried out in the temperature range of from about −20 to about +15° C. The contact time will vary in accordance with the specific reactants and conditions used. In general, a contact time of from about ½ to about 5 hours and preferably from about 1 to about 3 hours, is satisfactory. Somewhat longer or shorter contact times may, however, be employed within the scope of the invention.

Under the above-defined conditions the alkane tertiary monocarboxylic acid esters of epoxy-hydroxyalkanols, represented by foregoing Formula I, react with the sulfuric acid to form corresponding sulfated tertiary monocarboxylic acid esters of hydroxy alkanols. The products of the reaction are represented by the following general formulae II and III. In the reaction the epoxy-oxygen bond is broken with the formation of a product wherein, of the two carbons originally directly attached to a same oxygen atom, one now is attached to a hydroxyl group and the other to a sulfate (—OSO$_3$H) group. Two isomeric compounds are therefore generally obtained as represented by Formula II and III.

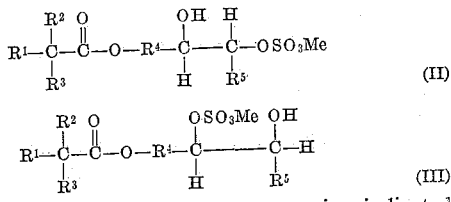

wherein R$^1$, R$^2$, R$^3$, R$^4$, R$^5$ have the meaning indicated therefor above in the definition of the Formula I; and Me is H. Comprised within the broad scope of the invention are compounds represented by foregoing formulae II and III wherein Me designates broadly a cation imparting water solubility to the product. Me in Formula II and III may be H or NH$_4$+; and it may also represent an alkali metal, such as Na, K, Li, etc., or an alkaline earth metal, such as, Ca, Ba, Mg, etc.

The sulfated esters are readily converted to the desired salts by neutralization with the suitable alkali metal, alkaline earth metal-, or ammonium-containing reagent. This may suitably be accomplished during the product recovery steps. Thus, the reaction mixture obtained may be neutralized by reaction with the suitable reagent, for example, sodium hydroxide. Preferred is the use of the alkaline reagent as an alcoholic solution, for example, an alcoholic caustic soda solution. Neutralization may suitably be executed at a temperature of, for example, from about room temperature to about 60° C. Higher or lower temperatures may, however, be employed. At least a substantial portion of the solvent, or diluent, employed and alcohol present is removed by distillation. The remaining solution is preferably extracted with a suitable organic solvent, for example, ether and/or pentane. Water is then removed by evaporation. Solids comprising, for example, sodium sulfate, are removed by filtration.

It is to be understood that the invention is not limited with respect to the method employed in recovering the desired sulfated ester, or salt thereof, from the reaction mixture.

The process of the invention enables the obtaining of the desired products efficiently in relatively high yields. The utilization of the epoxy ester as starting materials avoids the obtaining of the complex mixtures, difficult to separate, which are the result of esterification procedures starting with a polyhydroxy alkane, such as glycerol. If, for example, the partial esters are produced from glycerol in a two-step procedure via the mono-glyceride of a monocarboxylic acid, considerable amounts of the unwanted di-glyceride are generally unavoidably produced in the initial step. These are not readily separated from the mono-glyceride and result in further complications during the subsequent second stage of the process. The process of the invention, on the other hand, enables the production of a product predominating in the specifically desired partial ester or compositions predominating in mixtures of only specifically desired partial esters.

The following examples are illustrative of the hydroxy sulfate esters, and salts thereof, produced in accordance with the invention.

*Example I*

Trimethyl acetic acid (pivalic acid) is produced by reacting tert-butyl alcohol in n-heptane solution with carbon monoxide in the presence of concentrated sulfuric acid at 20° C. and 500 p.s.i.g., and reacting the resulting reaction mixture with water. Trimethyl acetic acid is recovered from the resulting reaction mixture by distillation. The trimethyl acetic acid is converted to the sodium salt by neutralization with NaOH in alcoholic solution. Glycidyl pivalate (trimethylacetic acid ester of 3-hydroxy-1,2-epoxypropane) is prepared by slowly adding 2 moles of the sodium salt of trimethyl acetic acid in aqueous solution to 18 moles of epichlorohydrin at boiling temperature. Upon completion of the reaction unconverted epichlorohydrin is distilled off leaving a reaction product consisting essentially of glycidyl pivalate. The glycidyl pivalate is added slowly to a mixture of 100% w. sulfuric acid and dry diethyl ether at a temperature of about 5° C. The mol ratio of sulfuric acid to total amount of ester charged is about 4:1. The diethyl ether is present in a ratio of ether to sulfuric acid of about 2:1. The reaction is carried out with stirring and the stirring is continued at about 5° C. for a period of about 1¾ hours. While still at the low temperature the resulting reaction mixture is neutralized with concentrated alcoholic sodium hydroxide. Ether solvent is driven off by evaporation. The remaining mixture is extracted with equal volumes of ether and pentane. Thereafter a part of the water is removed by evaporation and ethyl alcohol is added. The mixture is refluxed and sodium sulfate removed by filtration. Ethanol and water are then removed by evaporation leaving a product consisting essentially of trimethyl acetic acid of dihydroxypropane sodium sulfate. The product consists predominantly of the trimethyl acetic acid ester of 2,3-dihydroxypropane sodium sulfate

in admixture with a minor amount of the trimethyl acetic acid ester of 1,3-dihydroxypropane sodium sulfate

Similarly, each compound in following Table B, identified therein by a reference number, is obtained by reacting the tertiary carboxylic acid ester of epoxy-alkanol listed in foregoing Table A, identified therein by the same reference number as the derivative product of Table B, with sulfuric acid as described herein above, followed by neutralization of the reaction mixture with alcoholic sodium hydroxide and recovery of the product substantially as set forth in foregoing Example I.

TABLE B

Ref. No.:
(1) Trimethyl acetic acid ester of 2,3-dihydroxypropane sodium sulfate.
(1') Trimethyl acetic acid ester of 1,3-dihydroxypropane sodium sulfate.
(2) 2,2-dipropylpentanoic acid ester of 2,4-dihydroxybutane-1-sodium sulfate.
(2') 2,2-dipropylpentanoic acid ester of 1,4-dihydroxybutane-2-sodium sulfate.
(3) 2,2-dimethylbutanoic acid ester of 2,3-dihydroxy-1,3-dimethylpropane sodium sulfate.
(3') 2,2-dimethylbutanoic acid ester of 1,3-dihydroxy-1,3-dimethylpropane sodium sulfate.
(4) 2-ethyl-2-methylheptanoic acid ester of 2,3-dihydroxybutane-1-sodium sulfate.
(4') 2-ethyl-2-methylheptanoic acid ester of 1,3-dihydroxybutane-2-sodium sulfate.
(5) 2,2,4,4-tetramethylpentanoic acid ester of 3,6-dihydroxy-2-ethyl-2-sodium sulfate.
(5') 2,2,4,4-tetramethylpentanoic acid ester of 2,6-dihydroxy-2-ethyl-3-sodium sulfate.
(6) 2-ethyl-2-methylpentanoic acid ester of 2,4-dihydroxy-2-ethylbutane-1-sodium sulfate.
(6') 2-ethyl-2-methylpentanoic acid ester of 1,4-dihydroxy-3-ethylbutane-2-sodium sulfate.
(7) 2-cyclohexyl-2-methylpropionic acid ester of 2,4-dihydroxybutane-1-sodium sulfate.
(7') 2-cyclohexyl-2-methylpropionic acid ester of 1,4-dihydroxybutane-2-sodium sulfate.

(8) Tributyl acetic acid ester of 2,3-dihydroxypropane sodium sulfate.
(8') Tributyl acetic acid ester of 1,3-dihydroxypropane sodium sulfate.
(9) Trimethyl acetic acid ester of 2,10-dihydroxydecane-1-sodium sulfate.
(9') Trimethyl acetic acid ester of 1,10-dihydroxydecane-2-sodium sulfate.
(10) Dimethyl ethyl acetic acid ester of 2,7-dihydroxy-6-methylheptane-1-sodium sulfate.
(10') Dimethyl ethyl acetic acid ester of 1,7-dihydroxy-6-methylheptane-2-sodium sulfate.

Similarly prepared are the potassium-, lithium-, magnesium-, sulfates corresponding to the compounds of Table B by substituting the appropriate alkali metal neutralizing agent in the described reactions of Example I.

The hydroxy ester sulfate products of the invention are further exemplified by the following, which are obtained as indicated herein above by reacting the appropriate sulfated tertiary monocarboxylic acid esters of epoxy alkanol with the appropriate alkali metal, or alkaline earth metal, neutralizing agents.

The alkaline earth metal salts and alkali metal salts, such as, for example, the sodium, potassium, calcium, lithium or magnesium salts of:

Trimethyl acetic acid ester of 2,3-dihydroxypropane sulfate.
Trimethyl acetic acid ester of 2,4-dihydroxybutane-1-sulfate.
Diethyl acetic acid ester of 2,3-dihydroxy-1,3-dimethylpropane sulfate.
Tributyl acetic acid ester of 2,3-dihydroxypropane sulfate.
2-ethyl-2-n-butyl decanoic acid ester of 2,3-dihydroxypropane sulfate.

The sulfated hydroxy-substituted esters and their salts produced in the process of the present invention define a special class having a quaternary carbon atom in the alpha position with respect to the acyl group. It is the presence of the alpha-positioned quaternary carbon atom to which are attributed, at least in part, advantageous characteristics peculiar to the sulfated esters obtained in the process of the invention. Preferred hydroxy-substituted sulfated esters of tertiary alkane monocarboxylic acids and their salts obtained in accordance with the invention comprise the sulfated tertiary alkanoic acid esters of dihydroxypropane and their salts represented by the formulae:

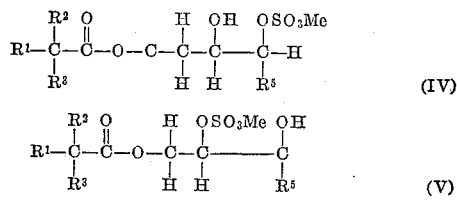

wherein $R^1$, $R^2$, $R^3$, $R^5$ and Me have the meaning as indicated hereinabove in the definition of compounds of formulae I, II, and III.

Compositions particularly valuable because of their characteristics and utility in the production of detergents comprise the mixtures of sulfated hydroxy-substituted esters of the present invention derived from chosen specific admixtures of the above-defined tertiary alkane monocarboxylic acids. Preferred are mixtures of sulfated hydroxy substituted esters, including the sulfated hydroxy propane esters and alkyl-substituted derivatives thereof, derived from admixed tertiary alkane monocarboxylic acids having from about 8 to about 21, and particularly preferred 14 to 20, carbon atoms to the molecule. Characteristics of the composition within this defined class may be controlled to obtain specifically desired modifications by controlling the specific molecular weight of the admixture of tertiary carboxylic acid from which the epoxy ester starting materials are derived. Thus, compositions possessing particularly desired characteristics with respect to surface activity in various forms of modifications comprise sulfated hydroxy-substituted ester compositions of the present invention such as the following: an admixture of the sodium salts of tertiary alkane monocarboxylic acid esters of 1,2-dihydroxypropane sulfate derived from admixed tertiary alkane monocarboxylic acids having fifteen to sixteen carbon atoms to the molecule; admixture of sodium salts of tertiary alkane monocarboxylic acid esters of 1,2-dihydroxypropane sulfate derived from admixed tertiary alkane monocarboxylic acids having from eighteen to nineteen carbon atoms to the molecule; and the composition consisting essentially of sodium salts of tertiary alkane monocarboxylic acid esters of 1,2-dihydroxypropane sulfate derived from tertiary alkane monocarboxylic acids predominating in acids having about seventeen carbon atoms to the molecule, boiling in the range of from about 335 to about 350° C. and having an average molecular weight of about 275. These compositions are readily obtained with aid of the present invention by reaction of the suitable epoxy-alkyl esters of these tertiary alkanoic monocarboxylic acid mixtures with sulfuric acid as described hereinabove.

The sulfated hydroxy ester products obtained in accordance with the present invention are of value because of their high wetting capacity and excellent foaming power. Their depressant action towards lime soap is outstanding rendering them admirably suited for use in hard water. Their properties render them eminently suitable for use as components of detergent compositions and as textile assistants that must have good wetting effect as well as cleansing properties. A particularly advantageous characteristic of the products obtained in the process of the invention is their unusually high resistance to hydrolysis.

The products of the process of the invention furthermore are of value as floatation agents, alkylating agents, tanning agents, and as intermediate and starting materials in the production of valuable chemical derivatives therefrom.

The sulfated hydroxy-substituted ester products obtained in accordance with the invention may be combined with components enhancing or modifying their properties for use as detergents or cleansing agents. Thus, they may have added thereto such materials as other surface-active compounds, alkali pyrophosphates or polyphosphates, silicates, carbonates, sulphates, borates, sodium carboxymethyl cellulose or other soluble derivatives of cellulose or starch, persulphates, perborates, percarbonates, optical bleaching agents, foaming agents, foam stabilizers, and the like.

The following examples are illustrative of the preparation of hydroxy-substituted ester sulfate compositions in accordance with the invention:

*Example II*

A mixture of olefins having from 13 to 19 carbon atoms to the molecule, obtained by cracking paraffinic hydrocarbons, is reacted with carbon monoxide and water, in liquid phase, with the aid of a catalyst consisting essentially of a phosphoric acid-boron trifluoride-water complex. From the resulting reaction mixture there is separated by distillation a fraction consisting predominantly of tertiary alkane monocarboxylic acids having from 14 to 20 carbon atoms to the molecule. The mixed tertiary monocarboxylic acids so obtained are converted to their sodium salts by reaction with sodium hydroxide.

The mixture of sodium salts of $C_{14}$–$C_{20}$ tertiary monocarboxylic acids so obtained is freed of residual hydrocarbons by extraction with gasoline. The concentration of the sodium salts in solution was adjusted to 50% by weight by addition of water.

A quantity of the aqueous salt solution containing 2 moles of the admixed sodium salts of $C_{14}$–$C_{20}$ alkanoic tertiary monocarboxylic acids was added gradually to 20 moles of epichlorohydrin over a period of 2½ hours. During this operation the temperature of the mixture was kept between 105° and 110° C. During the reaction, epichlorohydrin distilled off azeotropically with water. The distillate formed an epichlorohydrin phase and a water phase. The epichlorohydrin phase was continuously returned to the reactor. In this way the concentration of water in the reaction mixture was kept constant at 2 percent by weight.

At the end of the 2½ hour period excess epichlorohydrin was distilled off; first at normal pressure until the bottoms temperature reached 160° C.; then at a pressure of 20 mm. Hg at 120° C. The latter temperature and pressure conditions were maintained for one hour. The crude reaction product was cooled to 50° C. and washed three times with 150 ml. of distilled water to remove residual NaCl. The remaining glycidyl ester of $C_{14}$–$C_{20}$ tertiary alkanoic monocarboxylic acids was distilled in vacuo after initial removal of water.

The mixture of glycidyl esters of $C_{14}$–$C_{20}$ tertiary alkanoic monocarboxylic acids so obtained was added to a mixture of concentrated sulfuric acid (100% $H_2SO_4$ by weight) and dry diethyl ether at 5° C. The rate of addition was controlled to maintain the temperature at 5° C. The mixture was stirred during the addition of the ester to the sulfuric acid. The mol ratio of sulfuric acid to total amount of ester added was 3:1. The ratio of sulfuric acid to diethyl ether present was 1:2 by weight. When all the esters had been added, stirring was continued for another one and a half hours at the temperature of 5° C. Subsequently, while cooling the mixture, it was neutralized by addition of concentrated alcoholic caustic soda solution. Ether and alcohol were distilled off. The remaining solution was extracted with a mixture of equal volumes of ether and pentane. After that also the greater part of the water was evaporated. Ethanol was added in such a quantity that the ratio between ethanol and residual water was 9:1. After boiling the mixture a short time, while using a reflux condenser, the sodium sulphate was removed by filtration. Finally also residual ethanol and water were removed by evaporation leaving as the final product a composition consisting of $C_{14}$–$C_{20}$ tertiary alkanoic monocarboxylic acid esters of dihydroxypropane sodium sulfate. The $C_{14}$–$C_{20}$ tertiary alkanoic acid ester of dihydroxy propane sodium sulfate composition (consisting essentially of an admixture of $C_{14}$–$C_{20}$ tertiary alkanoic monocarboxylic acid esters of 2,3-dihydroxypropane sodium sulfates and of 1,3-dihydroxypropane sodium sulfates) was obtained with a yield of over 90%.

The foaming power and wetting power of the product were determined.

The foaming power of the composition so obtained consisting of $C_{14}$–$C_{20}$ alkane tertiary monocarboxylic acid esters of 2,3-dihydroxypropane-1-sodium sulfate identified herein as composition II was determined by means of the following test. Two solutions were prepared, both containing the hydroxypropyl ester sulfate "Composition II" in a concentration of 0.5 gram per liter; one containing in addition 0.05% of $Na_2SO_4$, and the other containing 0.8% of sodium pyrophosphate and 0.7% of $Na_2SO_4$. The first solution to be referred to as solution (a), may be considered as being "unbuilt," the second solution, to be referred to as solution (b), as being "heavily built." Both solutions were prepared using water with a hardness of 18 English degrees. Amounts of 100 ml. of the solutions were subjected to shaking at 45° C. during 10 seconds in a vessel of standard size and form so as to effect abundant formation of foam, and then "titrated" in the same vessel at 45° C. by adding 0.2-ml. portions of a mixture of 15% of neutral tallow, 15% of flour, 0.5% of sodium chloride and 69.5% of distilled water until the height of the layer of foam had been reduced to 0.5 cm. For comparison two standard solutions of surface-active agents, viz. a solution of a mixture of sodium salts of secondary alkyl sulphates with from 8 to 18 carbon atoms and mainly straight chains, and a solution of a sodium dodecylbenzene sulphonate derived from the tetramer of propene, were "titrated" in the same way. The first of the standard solutions is compared with solution (a), the second with (b). The foaming power numbers of solutions (a) and (b) were found by dividing the number of milliliters of titration liquid required for the solutions (a) and (b) with that required for the titration of the corresponding standard solutions, respectively, and multiplying the quotients by 100.

The wetting power number was determined using the following method:

A string of 5 grams of cotton threads, each 43 cm. long, was folded double around a hook to which were also attached a 4.5 g. lead weight and a lead anchor. The hook was then immersed in a solution of the surface-active material "Composition II." The anchor sank immediately. The air in the cotton threads first held the string in an upright vertical position. This air was gradually liberated from the string so that after some time it began to sink. The interval between immersion and commencement of sinking was measured. The experiment was carried out at various concentrations. By means of interpolation the concentration was found at which the interval between immersion and commencement of sinking would amount to 25 seconds (concentration X). This concentration was also determined for a standard detergent, namely a mixture of sodium salts of secondary alkyl sulphates and having 8 to 18 carbon atoms and substantially straight chains (concentration Y). The wetting power number is then defined as the quotient $$\frac{100 \ Y}{X}$$

(The wetting power of the reference is taken as 100.)
The outcome of these tests was as follows:

Foaming power number of (a) (unbuilt) _____ 108
Foaming power number of (b) (heavily built) ___ 75
Wetting power number _____ 154

*Example III*

In the same manner as described in Example I a glycerylestersulphate was prepared, starting from a mixture of olefins with from 14 to 15 carbon atoms in their molecules. The resulting $C_{15}$–$C_{16}$ tertiary alkanoic acid ester of dihydroxypropane sodium sulfate composition was tested for its foam stability by washing dishes under standardized conditions. A foam stability number could be determined on the basis of a comparison with the performance of a standard solution. As such was employed a solution of a mixture of sodium salts of secondary alkyl sulphates with from 8 to 18 carbon atoms in the molecule and mainly straight chains. The foam stability number of the standard solution equals 100 by definition. The foam stability number of the $C_{15}$–$C_{16}$ tertiary alkanoic acid-glycerylestersulphate composition was found to equal 273.

*Example IV*

In the same manner as described in Example I a glycerylestersulphate was prepared, starting from an olefin with 16 carbon atoms in the molecule. The foam stability number of the resulting $C_{17}$-tertiary alkanoic acid glycerylestersulphate, determined by means of the method of Example III was found to be 300.

*Example V*

In the same manner as described in Example I a glycerylestersulphate was prepared, starting from a mixture of olefins having from 17 to 18 carbon atoms in their molecules. The foam stability number of the resulting $C_{18}$–$C_{19}$ tertiary alkanoic acid-glycerylestersulphate determined by means of the method of Example III was found to be 250.

*Example VI*

In the same manner as described in Example I a glycerylestersulphate was prepared, starting from a mixture of olefins with from 14 to 18 carbon atoms in the molecule. The foam stability number of the resulting $C_{15}-C_{19}$ tertiary alkanoic acid-glycerylestersulphate determined by means of the method of Example IV was found to be 250.

Similarly prepared are the K, Li, Ca and Mg salts of the mixed tertiary alkanoic monocarboxylic acid esters of 2,3-dihydroxypropane sulfate and of the mixed tertiary alkanoic monocarboxylic acid esters of alkyl-substituted dihydroxypropane sulfates.

By the terms tertiary alkanoic carboxylic acid, alkane tertiary carboxylic acid and alkane tertiary monocarboxylic acid, as used herein and in the attached claims, it is intended to mean that the organic acids so referred to contain a quaternary carbon atom directly attached to the carbon atom of the carboxyl group.

We claim as our invention:

1. The process for the production of a surface active compound which comprises reacting a tertiary alkanoic acid ester of a 3-hydroxy-1,2-epoxy lower alkane with concentrated sulfuric acid, at a temperature of from about −20 to about 35° C.

2. The process in accordance with claim 1 wherein said reaction is executed in the presence of an inert organic medium.

3. The process in accordance with claim 2 wherein the resulting reaction mixture is neutralized by reaction with an alkaline neutralizing agent.

4. The process for the production of a surface active compounds which comprises reacting a tertiary alkanoic acid ester of a hydroxy-substituted-1,2-epoxyalkane having from 5 to about 21 carbon atoms in the tertiary alkanoic acid portion of the molecule and from 3 to about 22 carbon atoms in the epoxyalkane portion of the molecule with concentrated sulfuric acid at a temperature of from about −20 to about 35° C.

5. The process in accordance with claim 4 wherein said reaction is executed in the presence of an inert organic solvent.

6. The process in accordance with claim 4 wherein the said reaction is executed in the presence of diethyl ether.

7. The process in accordance with claim 4 wherein the resulting reaction products are neutralized by reaction with an alkali metal hydroxide.

8. The process for the production of a surface active compound which comprises reacting a tertiary alkanoic acid ester of a 3-hydroxy-1,2-epoxypropane having from 5 to about 22 carbon atoms in the tertiary alkanoic acid portion of the molecule and from 3 to about 22 carbon atoms in the epoxypropane portion of the molecule, with concentrated sulfuric acid, at a temperature of from about −20 to about +15° C.

9. The process in accordance with claim 8 wherein the resulting reaction products are neutralized by reaction with an alkali metal hydroxide.

10. The process for the production of a surface active compound which comprises reacting a tertiary alkanoic acid ester of 3-hydroxy-1,2-epoxypropane containing from 8 to about 25 carbon atoms in the molecule with concentrated sulfuric acid at a temperature of from about −20 to about +15° C., and neutralizing the resulting reaction products with sodium hydroxide.

11. The process for the production of a surface active compound which comprises reacting a trialkyl acetic acid ester of 3-hydroxy-1,2-epoxypropane having from 8 to 25 carbon atoms in the molecule with concentrated sulfuric acid, at a temperature of from about −20 to about 15° C. and reaction the resulting reaction mixture with sodium hydroxide.

12. The process for the production of a surface active compound which comprises reacting glycidyl ester of pivalic acid with concentrated sulfuric acid, at a temperature of from about −20° C. to about 15° C., and reacting the resulting reaction mixture with an alkali metal hydroxide.

13. The process for the production of a surface active composition which comprises reacting a mixture of tertiary alkanoic acid esters of 3-hydroxy-1,2-epoxyalkanes epoxyalkanes having from 8 to about 21 carbon atoms in the tertiary alkanoic acid portion of the molecule and from 3 to about 22 carbon atoms in the epoxyalkane portion of the molecule, with concentrated sulfuric acid, at a temperature from about −20 to about 35° C.

14. The process in accordance with claim 13 wherein the resulting reaction products are neutralized with an alkaline neutralizing agent.

15. The process for the production of a surface active composition which comprises reacting a mixture of tertiary alkanoic acid esters of a 3-hydroxy-1,2-epoxypropane having from 8 to about 21 carbon atoms in the tertiary alkanoic acid portion of the molecule with concentrated sulfuric acid, at a temperature of from about 20 to about 35° C.

16. The process in accordance with claim 15 wherein the said reaction is executed in the presence of an inert organic solvent.

17. The process in accordance with claim 15 wherein the resulting reaction products are reacted with an alkali metal hydroxide.

18. The process for the production of a surface active composition which comprises reacting a mixture of glycidyl esters of tertiary alkanoic acids having from 8 to about 21 carbon atoms to the molecule with concentrated sulfuric acid in the presence of a solvent consisting essentially of diethyl ether at a temperature of from about −20 to about 15° C., and neutralizing the resulting reaction products with sodium hydroxide.

19. The process for the production of a surface active composition which comprises reacting a mixture of glycidyl esters of tertiary alkanoic acids having from about 18 to about 19 carbon atoms to the molecule with concentrated sulfuric acid at a temperature of from about −20° to about 15° C., and reacting the resulting reaction mixture with sodium hydroxide.

20. The process for the production of a surface active composition which comprises reacting a mixture consisting essentially of glycidyl esters of tertiary alkanoic acids having from about 15 to about 16 carbon atoms to the molecule with concentrated sulfuric acid, at a temperature of from about −20 to about 35° C., and neutralizing the resulting reaction products with sodium hydroxide.

21. The process for the production of a surface active composition which comprises reacting a mixture consisting essentially of glycidyl esters of tertiary alkanoic acids having about 17 carbon atoms to the molecule with sodium bisulfite, at a temperature of from about 40° to about 200° C., in the presence of aqueous methanol.

No references cited.